Sept. 28, 1943.   A. L. GRISÉ   2,330,704
HOSE NOZZLE
Filed Dec. 5, 1941
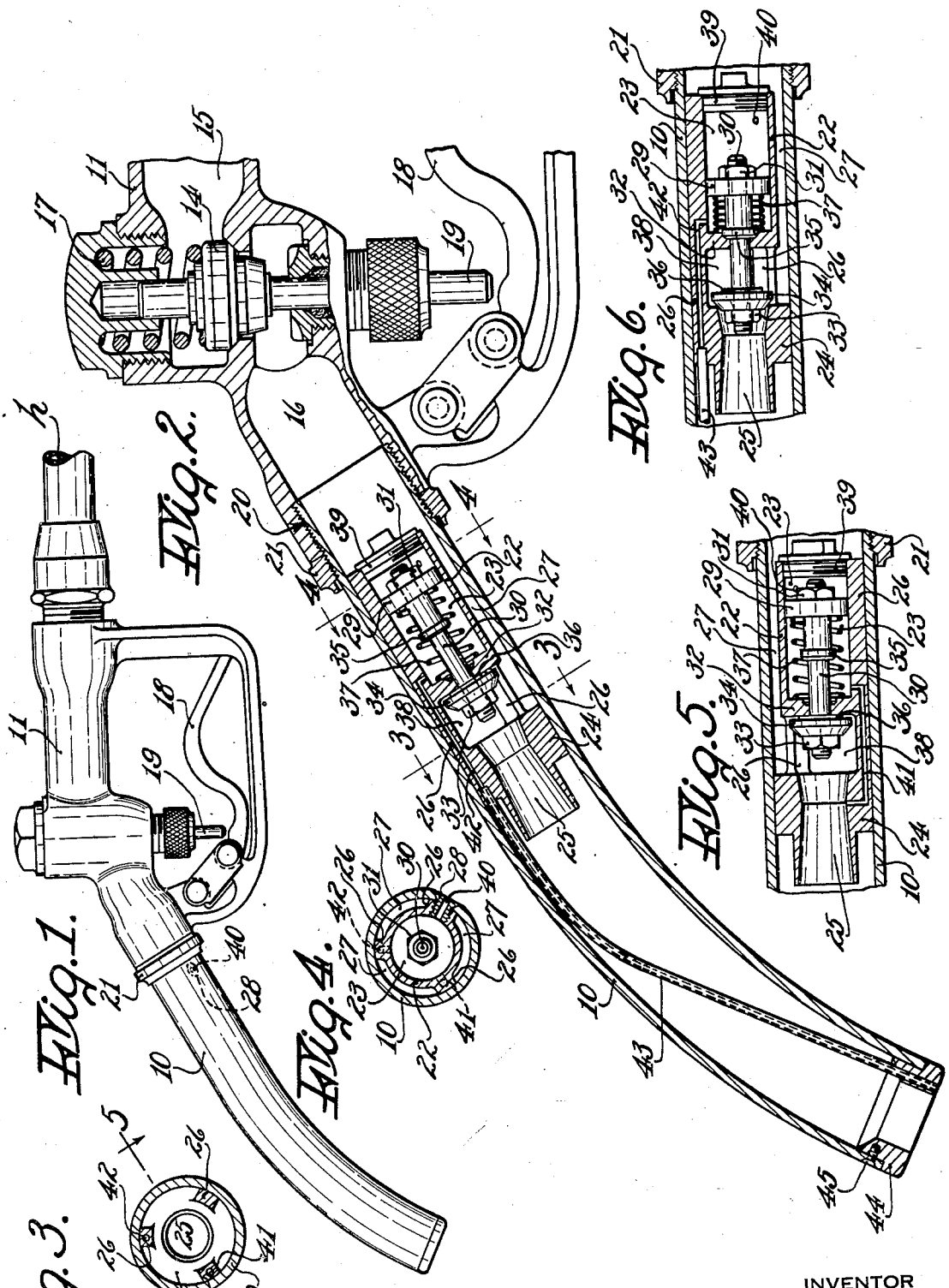
INVENTOR
ALFRED L. GRISÉ
BY
Chapin + Neal
ATTORNEYS Patented Sept. 28, 1943

2,330,704

UNITED STATES PATENT OFFICE 2,330,704

HOSE NOZZLE

Alfred L. Grisé, Springfield, Mass., assignor to Gilbert & Barker Manufacturing Company, West Springfield, Mass., a corporation of Massachusetts Application December 5, 1941, Serial No. 421,719

4 Claims. (Cl. 226—127)

This invention relates to an improved automatic safety valve. The valve of this invention is intended and particularly suitable for use in connection with the hose nozzle of a gasoline dispensing apparatus for the purpose of automatically shutting down the flow when the tank being serviced becomes full.

The invention has for an object the provision of an improved safety valve for the purpose described having high sensitivity to make it responsive to a wide range of rates of flow and particularly to a very low rate of flow.

More particularly, the invention provides a safety valve of the class described which is actuated in one direction by fluid pressure, such for example as air pressure, made effective by the suction effect created by the flow of dispensed liquid through a venturi in the spout of the hose nozzle.

The invention also has for an object the provision of a safety valve of the class described, actuated by the piston of a pneumatic cylinder located in the nozzle spout,—the piston rod carrying inner and outer valves, respectively adapted to seat on the inner and outer faces of that cylinder head through which the piston rod passes, and prevent leakage of liquid into the cylinder past the rod when the safety valve is in closed and open positions respectively.

The invention has for a further object the provision of means for preventing the complete closure of the safety valve,—the arrangement being such that the nozzle flow is shut down to very low limits when the tank is nearly full but not entirely closed off, leaving a trickling flow to enable the operator to completely fill the tank and finally shut off the trickling flow by closure of the main valve of the hose nozzle.

According to another object of the invention, the means which limits the closure of the safety valve may be the inner valve, above described, for engaging the inner face of one head of the cylinder.

The invention will be disclosed with reference to the accompanying drawing, in which:

Fig. 1 is an exterior elevational view of a hose nozzle embodying the invention;

Fig. 2 is a sectional elevational view thereof drawn to a larger scale and showing the safety valve in open position;

Figs. 3 and 4 are cross sectional views taken on the lines 3—3 and 4—4, respectively, of Fig. 2;

Fig. 5 is a fragmentary sectional view taken on the line 5—5 of Fig. 3; and

Fig. 6 is a fragmentary view taken similarly to Fig. 2 but showing the safety valve in flow-throttling position.

Referring to the drawing: the automatic safety valve structure is mounted and wholly contained within a casing 10 of tubular, pipe-like form. This casing forms the spout portion of a hose nozzle, the body portion of which is designated 11. The arrangement is such that the ordinary spout of the hose nozzle may be unscrewed and replaced with the spout of this invention, which has within it the automatic safety valve. No other change in the hose nozzle or its hand-operated valve need be made.

The hose nozzle body 11 (Fig. 2) contains a flow control valve 14 and has inlet and outlet passages 15 and 16 leading to and from the valve. A spring 17 tends to close the valve. The valve may be manually opened by means of a pivoted hand lever 18 which, when moved toward the body 11, engages the stem 19 of valve 14 and lifts the valve against the force of spring 17. The inlet passage 15 is adapted for connection to the hose h of a gasoline dispenser. The outlet passage 16 is adapted for connection to the spout 10 and has an interiorly threaded portion to receive the exteriorly threaded portion 20 of the spout. A lock nut 21 is threaded on the portion 20 and engages the end face of the outlet portion of the nozzle body.

The details of construction of the nozzle body and its hand-operated valve are not important and may be varied within wide limits, as desired. The invention is concerned primarily with an automatic safety valve structure which may be applied to any form of hose nozzle.

Referring to Fig. 2, mounted within spout 10 and intermediate the inlet and outlet ends thereof, is a hollow cylindrical body 22, containing a cylinder 23. Spaced from this body toward the outlet of the spout is a second and larger cylindrical body 24 which completely fills the tubular spout, fitting tightly against the cylindrical wall thereof. This body 24 is provided with a centrally located axial passage 25 forming a venturi. The two bodies 22 and 24 are interconnected by a plurality (three as shown in Figs. 3 and 4) of angularly-spaced bars 26 which extend parallel to the axes of the bodies (Fig. 2), across the gap between them, and along the entire length of body 22. These bars serve as spacers between the interior peripheral wall of spout 10 and the outer peripheral wall of body 24. Passages 27 (Fig. 4) are left between said walls and bars for the flow of liquid from the nozzle body 11 to the venturi 25 and thus through the spout 10 and into the tank to be serviced. The interconnected members 22 and 24 are held in place in the spout in any suitable way, as by a single screw 28 (Fig. 4), which passes through the wall of spout 10 and threads into one of the bars 26.

Slidably mounted in the cylinder 23 (Fig. 2) is a piston 29 which may be of any suitable form. One form, at present considered desirable, is a simple disk of carbon, perforated to receive the turned-down inner end of the piston rod 30 and clamped thereto, as indicated, by a nut 31. The rod 30 is mounted to slide freely in the integral head 32 of the cylinder and extends outwardly into the space 38 between the two bodies 22 and 24, having on its outer turned-down end a safety valve 34 clamped thereto by a nut 33. This valve is intended to cooperate with the inner end face of body 24 as a seat. Upon the rod 30 and located within cylinder 23 is a combined stop and valve 35, which is intended to engage the inner face of head 32 as a seat. This engagement occurs just slightly before valve 34 can engage its seat. Valve 34 is therefore not completely closed but is purposely left "cracked open" (see Fig. 6) to allow a trickling flow to continue after the main flow has been throttled down and nearly stopped. A relatively light spring 37 acts between head 32 and piston 29 to hold valve 34 in the open position shown in Fig. 2. It will be noted that valve 34 is then held against head 32 and is shielded to a substantial extent from the flow of liquid which rushes through the several passages 27 into the space 38 and thence into the venturi. The back portion 36 of valve 34 cooperates like a valve with the outer face of head 32 for a purpose to be later described.

A screw threaded plug 39 closes the inner end of cylinder 23 and acts as a head therefor. The plug 39, when removed, enables assembly of the valves, rod and piston. This is done before the unit comprising the bodies 22 and 24 and connecting bars 26 is placed in tube 10. The piston rod 30 and piston 29, in assembled relation, with the spring 37 encompassing the rod, are inserted into cylinder 23 and the free end of the rod is passed through head 32. The valve 34 is placed in space 38 in position to receive the free end of rod 30 which is passed therethrough. The nut 33 is applied to rod 30 to clamp the valve 34 thereto. The plug 39 is then screwed into the cylinder. Then the described unit is slipped into tube 10 and held in place by the screw 28.

The right hand end of cylinder 23 is continuously vented to the atmosphere by a passage, such as 40, which extends axially through screw 28, or in any other suitable way. This vent is located to the right of any normal position which piston 29 can assume in cylinder 23. The left hand end of this cylinder continuously communicates with the throat of the venturi 25 by means of a passage 41 (Fig. 5) of small bore which extends through one of the arms 26. Also, extending from the left hand end of cylinder 23 is another passage 42 of small bore which extends through another one of the arms 26 and communicates with a small copper pipe 43. Both passages 41 and 42 open into cylinder 23 to the left of any normal position that piston 29 can assume in the cylinder. The pipe 43 is suitably fixed, as by soldering or otherwise, to the member 24 and extends to and terminates at the outlet end of spout 10.

Preferably, the outlet end of spout 10 is contracted to some extent, as by the flanged collar 44 which is held to the spout by a screw 45, as indicated. The object sought for is to choke the flow of liquid to an extent sufficient to make the liquid fill the spout and thereby prevent the entrance of air through the spout. It is desired to have all the air enter in a controlled and predetermined manner, that is through pipe 43. If air also enters by way of the spout 10, it will diminish and possibly destroy the vacuum which is created in passage 41 by means of the rush of liquid through the venturi. This vacuum is neutralized by air entering through pipe 43 up to the time when the tank being serviced is nearly full. However, when the liquid in the tank being serviced rises high enough to close and seal the outer end of pipe 43, then the vacuum created as described becomes effective on the left hand end of cylinder 23. It would not do to have this vacuum weakened by air flow to the venturi through the spout. When the vent to the left hand end of cylinder 23 is closed as described, the suction created by the venturi reduces the pressure in the left hand end of the cylinder below atmospheric, whereupon a pressure differential is created which moves piston 29 rapidly to the left until valve 35 seats on the cylinder head 32 as shown in Fig. 6. The valve 34 is then nearly but not entirely closed, thereby reducing the flow to a very low limit, as for example, to one gallon a minute from a normal full flow of about 20 gallons per minute. A slow trickling flow continues until the tank is completely filled, when the operator quickly stops the flow by allowing valve 14 to snap into closed position.

The invention provides an automatic safety valve which is very sensitive and which will operate successfully with little power and on very slow flows, as for example, on flows as low as one and one-half gallons per minute. Contributing to this result is the use of a piston rod of very small diameter, at least at that part which slides through head 32, thereby keeping as low as feasible the area of frictional contact between the rod and head. This rod is made to slide freely through the head. No stuffing box, or equivalent means, such as would of necessity present much frictional resistance to sliding movement of the rod, is employed. Instead the rod is allowed to slide easily in head 32 and leakage into the cylinder around the rod is kept down by the valve action of the rear portion 36 of valve 34 on head 32, when valve 34 is fully open, and by the action of valve 35 on head 32, when valve 34 is in its substantially closed position. The valve 34 does not remain in intermediate positions but quickly moves from one extreme position to another. However, the flow into the venturi is away from head 32 and leakage of liquid into the cylinder is unlikely while the valve 34 is in any of its intermediate positions. Thus, an easy working piston-operated valve is provided, capable of operating quickly on even a small degree of vacuum. At the same time leakage into the cylinder is effectively guarded against by the outer and inner valves 36 and 35, respectively. Such leakage has the disadvantage of causing spitting of gasoline through the vent, such as 40, which has to be provided for the cylinder 23.

It is to be noted that the valve 34, when once started in motion toward its substantially closed position, is rapidly and powerfully moved into such position by the flow of liquid acting on the back face of valve 34.

It will also be noted that the cylinder is so constructed as to be quickly vented to enable the spring 37 to restore the valve 34 to open position. As soon as the spout 10 is lifted from the fill opening of the tank being serviced, air rushes in through pipe 43 and passage 42 into the left hand end of cylinder 23. Thus, such end is rapidly placed under atmospheric pressure and, since atmospheric pressure prevails in the right hand end of cylinder 23, the spring 37 will move piston 29 to the right and open valve 34.

What I claim is:

1. In a hose nozzle, a delivery spout provided intermediate its ends with a constriction forming a venturi, said spout also having a valve seat on the inlet side of the venturi, a member mounted within said spout on the inlet side of said venturi and provided with a cylinder located coaxially of said valve seat, a piston slidable in said cylinder, a piston rod fixed to said piston and extending through one end of said cylinder toward said valve seat, a valve fixed to said rod to cooperate with said seat, a spring for moving said valve away from its seat, a conduit leading from the throat of the venturi to that end of said cylinder which lies nearest said valve, a conduit leading from the delivery end of said spout to the last-named end of said cylinder, and a conduit leading from the atmosphere to the opposite end of said cylinder.

2. In a hose nozzle, a delivery spout provided intermediate its ends with a constriction forming a venturi and provided near its outlet end with a second constriction to choke the outflow of liquid and make the liquid fill the spout between the two constrictions, said spout also having a valve seat on the inlet side of the venturi, a valve to cooperate with said seat, a cylinder connected with said spout, a piston slidable in said cylinder, a piston rod fixed to said piston and connected to move said valve in one direction, a spring for moving the valve in the other direction, a conduit connecting the throat of said venturi to one end of said cylinder, a conduit connected to said end of said cylinder and extending to the outlet end of said spout, and a conduit connecting the opposite end of said cylinder to the atmosphere.

3. In a hose nozzle, having a delivery passage with a valve seat intermediate the ends thereof, a valve cooperating with said seat, spring means to move said valve away from its seat, fluid-pressure means for moving said valve toward closed position; said last-named means including a cylinder, piston and piston rod; said cylinder having a head which is exposed to liquid flowing in said passage and through which said rod passes said valve being fixed to the projecting end of said rod, and a pair of valve members on said rod, one outside and one inside said cylinder and adapted to seat one on the outer face of said head when the first-named valve is in open position and one on the inner face of said head when the first-named valve is in its other position.

4. In a hose nozzle, having a delivery passage with a valve seat intermediate the ends thereof, a member mounted in said passage on the inlet side of said seat and spaced from the walls of said passage to allow flow of liquid to said seat, said member having a cylinder located coaxially of said valve seat and having heads, a piston in said cylinder, a rod fixed to the piston and projecting through one head of the cylinder, a valve on the projecting end of said rod to cooperate with said seat, a valve on said end of said rod to engage the outer face of said last-named head when the first valve is open, a spring to hold the first valve in open position, fluid pressure means controlled by the entrance of liquid into the outlet end of said delivery passage for moving said piston against the force of said spring and thereby moving said first valve toward closed position, and a valve on said rod inside said cylinder to engage the inner face of said last-named head of the cylinder and limit the movement of the first valve toward closed position, said second-named and third-named valves serving to prevent entrance of liquid to said cylinder through said last-named rod around said rod when the first valve is in open and closed positions respectively.

ALFRED L. GRISÉ.